United States Patent
Greene et al.

(10) Patent No.: US 9,929,895 B2
(45) Date of Patent: *Mar. 27, 2018

(54) UNIQUE IDENTIFIERS FOR BROWSERS

(71) Applicant: PARRABLE, INC., New York, NY (US)

(72) Inventors: Justin E. Greene, New York, NY (US); Dharun Ravi, Plainsboro, NJ (US)

(73) Assignee: PARRABLE INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/155,263

(22) Filed: May 16, 2016

(65) Prior Publication Data

US 2016/0364498 A1    Dec. 15, 2016

Related U.S. Application Data

(63) Continuation of application No. 14/716,187, filed on May 19, 2015, now Pat. No. 9,342,617.

(51) Int. Cl.
*G06F 17/30* (2006.01)
*H04L 29/08* (2006.01)
(Continued)

(52) U.S. Cl.
CPC .... *H04L 41/0293* (2013.01); *G06F 17/30876* (2013.01); *G06F 17/30902* (2013.01);
(Continued)

(58) Field of Classification Search
CPC .............. H04L 29/08072; H04L 29/06; H04L 29/0809; H04L 29/08981; H04L 67/306; H04L 67/22; G06Q 30/02; G06F 17/30899

See application file for complete search history.

(56) References Cited

U.S. PATENT DOCUMENTS 8,370,475 B1 * 2/2013 Harvey ................ H04L 67/20
                                                     709/223
9,342,617 B1  5/2016 Greene
(Continued)

OTHER PUBLICATIONS

U.S. Appl. No. 14/716,187 Office Action dated Sep. 18, 2015.

*Primary Examiner* — Abdullahi E Salad
(74) *Attorney, Agent, or Firm* — Polsinelli LLP (57) ABSTRACT

A webpage may be downloaded by a browser at a computing device. Such downloaded webpage may be associated with a reference to a browser identifier file. The browser may be directed to access the referenced browser identifier file. As a result, the browser may automatically check a local browser cache for the referenced browser identifier file. A request regarding the referenced browser identifier file may be sent over a communication network to an identifier server. Such request may be indicative of whether the referenced browser identifier file is found in the local browser cache. A response may be received from the identifier server. Such response may include the referenced browser identifier file when the referenced browser identifier file (or a current version thereof) is not found in the local browser cache. Alternatively, the response may include an indicator when the referenced browser identifier file is found in the local browser cache. The contents of the referenced browser identifier file may be made available to the browser and other related applications.

20 Claims, 3 Drawing Sheets

(51) Int. Cl.
*H04L 12/24* (2006.01)
*H04L 29/12* (2006.01)

(52) U.S. Cl.
CPC ...... *H04L 41/0266* (2013.01); *H04L 61/1547* (2013.01); *H04L 61/609* (2013.01); *H04L 67/02* (2013.01); *H04L 67/06* (2013.01); *H04L 67/18* (2013.01)

(56) References Cited

U.S. PATENT DOCUMENTS

| | | | |
|---|---|---|---|
| 2002/0054161 A1* | 5/2002 | Durham | G06F 17/30902 715/841 |
| 2007/0106748 A1 | 5/2007 | Jakobsson et al. | |
| 2007/0220000 A1 | 9/2007 | Walsh | |
| 2009/0083442 A1* | 3/2009 | Sutter | G06Q 10/06 709/248 |
| 2013/0024759 A1* | 1/2013 | Yuan | G06F 17/30902 715/205 |
| 2013/0110906 A1* | 5/2013 | Zearing | G06F 17/30902 709/203 |
| 2013/0173695 A1 | 7/2013 | Arsenault | |
| 2014/0019245 A1* | 1/2014 | Wilson | G06Q 30/02 705/14.55 |
| 2014/0129670 A1 | 5/2014 | Oliver | |
| 2014/0149577 A1 | 5/2014 | Monighetti | |

* cited by examiner

UNIQUE IDENTIFIERS FOR BROWSERS

CROSS-REFERENCE TO RELATED APPLICATIONS

This application is a continuation and claims the priority benefit of U.S. patent application Ser. No. 14/716,187 filed May 19, 2015, issuing as U.S. Pat. No. 9,342,617, the disclosure of which is incorporated herein by reference.

BACKGROUND

Field of the Invention

The present invention generally relates to browsers. More specifically, the present invention relates to associating unique identifiers with browsers.

Description of the Related Art

The use of Internet and web resources is nearly ubiquitous throughout the industrialized world. Users generally access the Internet using any of a number of computing devices capable of communicating over a communication network, whether wirelessly or through wired connections. More specifically, the user may use a browser application on a computing device to access content on any of a number of webpages and websites hosted by one or more web servers.

Upon request, such a browser may download content related to a designated webpage, as well as render the webpage to be displayed. Such downloaded content may include a variety of different types of files, including documents, graphics, audio and video, etc., as well as related data (e.g., metadata, stylesheets including cascading stylesheets). The downloaded content may be stored in a browser cache in local memory of the computing device. Various elements and components of a particular webpage or website may change over time (e.g., as a publisher publishes new or updated content). Some components or elements, however, remain static and unchanged. When the user leaves the webpage and later wishes to return, the browser cache allows the computing device to retrieve static, unchanged files related to the associated webpage from local memory, rather than re-downloading the same web objects when a user wishes to revisit the webpage.

Currently, browsers do not contain or expose any unique identifiers that can be accessed and used by websites. Present websites and webpages may track and share data regarding the activity (e.g., repeat visits) of the user in relation to a particular webpage. Such data may include state information (e.g., preferences, shopping cart items), provide registration or authentication information (e.g., user names, passwords, addresses/locations), or otherwise track browsing history (e.g., which webpages were visited, a number of visits, when the visits occurred). Because nearly all aspects of modern life may be reflected in or otherwise involve Internet activity, however, some of the tracked data may be personally identifiable of a particular individual. Tracking mechanisms that encompass such personally identifiable data may therefore risk exposure of personal, confidential, and/or otherwise sensitive user information. In the interests of protecting user privacy, some jurisdictions may even have statutes or regulations restricting the type of data that may be tracked.

Meanwhile, various publishers, service providers, and related entities may be interested in obtaining statistical data regarding the user traffic that visits a given webpage or website. Although a web server may be able to identify a number of download requests for a particular webpage, such requests may be made by the same user (or the same small set of users). Such a metric may therefore fail to present an accurate picture of the traffic or user activity involving the webpage, while using more the particularized data discussed above may risk exposure of information that is personally identifiable of a specific user.

There is, therefore, a need in the art for improved systems and methods for associating unique identifiers with browsers independent of any particular website.

SUMMARY OF THE CLAIMED INVENTION

Embodiments of the present invention allow for associating unique identifiers with browsers. A webpage may be downloaded by a browser at a computing device. Such downloaded webpage may be associated with a reference to a browser identifier file. The browser may be directed to access the referenced browser identifier file. As a result, the browser may automatically check a local browser cache for the referenced browser identifier file. A request regarding the referenced browser identifier file may be sent over a communication network to an identifier server. Such request may be indicative of whether the referenced browser identifier file is found in the local browser cache. A response may be received from the identifier server. Such response may include the referenced browser identifier file when the referenced browser identifier file is not found in the local browser cache. Alternatively, the response may include an indicator when the referenced browser identifier file is found in the local browser cache. The contents of the referenced browser identifier file may be made available to the browser and other related applications.

Various embodiments may include methods for associating unique identifiers with browsers. Such methods may include detecting that a webpage is being downloaded by a browser at a computing device where the downloaded webpage is associated with a reference to a browser identifier file, directing the browser to access the referenced browser identifier file where the browser automatically checks a local browser cache for the referenced browser identifier file, sending a request indicative of whether the referenced browser identifier file is found in the local browser cache, receiving a response from an identifier server that includes the referenced browser identifier file when the referenced browser identifier file is not found in the local browser cache where the response includes an indicator when the referenced browser identifier file is found in the local browser cache, and updating information regarding the referenced browser identifier file in the local browser cache. The content in the referenced browser identifier file may be accessible by the browser.

Additional embodiments may include systems for associating unique identifiers with browsers. Such systems may include an identifier server and a user computing device. Such user computing device may include memory comprising a local browser cache that stores previously downloaded web files, a processor that executes a browser application and a loader application, and a communication interface. The browser application may be executed to download a webpage from a web server where the downloaded webpage is associated with a reference to a browser identifier file. The loader application may be executed to direct the browser application to access the referenced browser identifier file. The browser application may thereafter automatically check a local browser cache for the referenced browser identifier file. The communication interface may send a request regarding the referenced browser identifier file to the identifier server where the request indicative of whether the referenced browser identifier file is found in the local browser cache. The identifier server may send a response that includes the referenced browser identifier file when the referenced browser identifier file is not found in the local browser cache and that includes an indicator when the referenced browser identifier file is found in the local browser cache. The local browser cache may update information regarding the referenced browser identifier file, whose content is made accessible by the browser application.

Further embodiments include non-transitory computer-readable storage media having embodied thereon a program executable by a processor to perform a method for associating unique identifiers with browsers as described above.

DETAILED DESCRIPTION

Embodiments of the present invention allow for associating unique identifiers with browsers. A webpage may be downloaded by a browser at a computing device. Such downloaded webpage content may include a reference (e.g., URL) to a browser identifier file (e.g., a file that includes at least an identifier assigned to the browser at the computing device). The browser may be directed to access the referenced browser identifier file. As a result, the browser may automatically check a local browser cache for the referenced browser identifier file. A request regarding the referenced browser identifier file may be sent over a communication network to an identifier server. Such request may be indicative of whether the referenced browser identifier file is found in the local browser cache. A response may be received from the identifier server. Such response may include the referenced browser identifier file when the referenced browser identifier file is not found in the local browser cache. Alternatively, the response may include an indicator when the referenced browser identifier file is found in the local browser cache. Such an indicator may indicate that the cached browser identifier file is valid and can be used. The contents of the referenced browser identifier file may be made available to the browser and other related applications.

Figure 1:
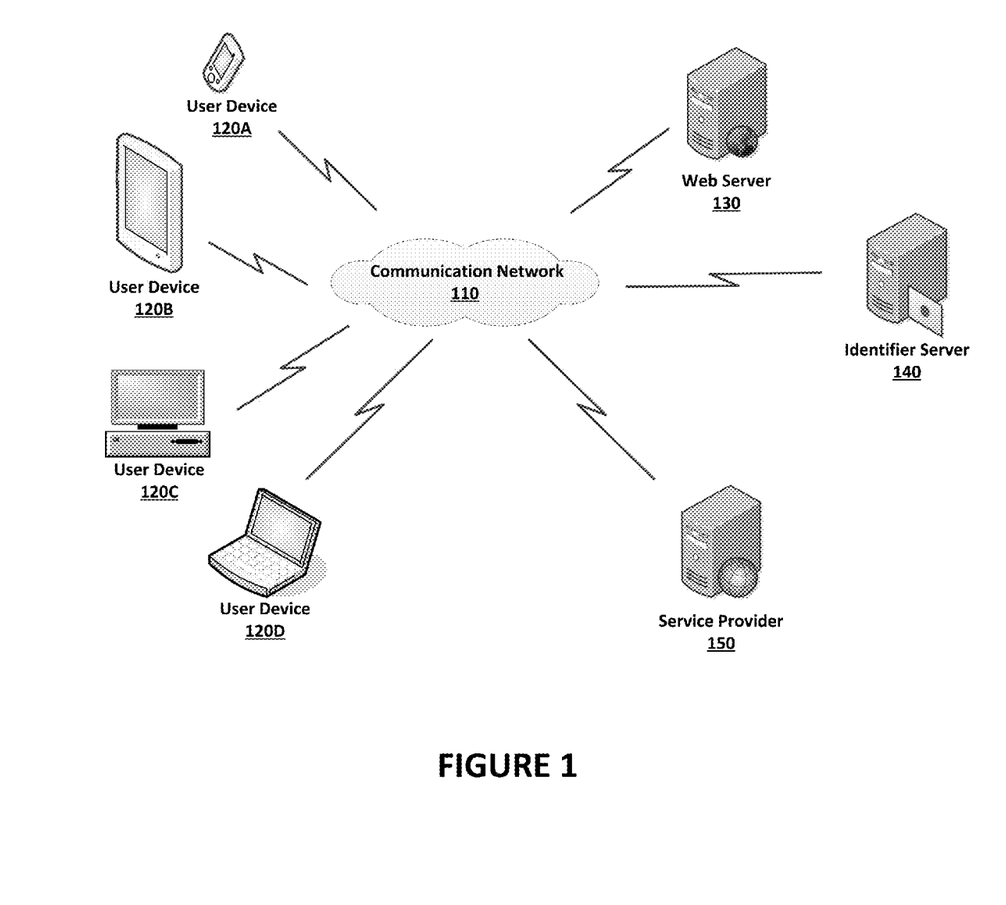
FIG. 1 illustrates an exemplary network environment in which a system for associating unique identifiers with browsers may be implemented.

FIG. 1 illustrates a network environment 100 in which a system for associating unique identifiers with browsers may be implemented. Network environment 100 may include a communication network 110, one or more user devices 120A-D, web server 130, identifier server 140, and one or more service providers 150. Devices in network environment 100 may communicate with each other via communications network 110.

Communication network 110 may be a local, proprietary network (e.g., an intranet) and/or may be a part of a larger wide-area network. The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, cellular or mobile service providers, a cable service provider, a provider of digital subscriber line (DSL) services, or a satellite service provider. Communications network 110 allows for communication between the various components of network environment 100.

Users may use any number of different electronic user devices 120A-D, such as general purpose computers, mobile phones, smartphones, smartwatches, wearable devices, personal digital assistants (PDAs), portable computing devices (e.g., laptop, netbook, tablets), desktop computing devices, handheld computing device, or any other type of computing device capable of communicating over communication network 110. User devices 120 may also be configured to access data from other storage media, such as local caches, memory cards, or disk drives as may be appropriate in the case of downloaded services. User device 120 may include standard hardware computing components such as network and media interfaces, non-transitory computer-readable storage (memory), and processors for executing instructions that may be stored in memory.

In addition, user devices 120 may include a variety of applications, including browser applications that allow the user to request certain webpages. For example, a user may enter a uniform resource locator (URL) into a browser application. Such a browser may send such request to an associated web server (e.g., web server 130), receive responsive data (e.g., webpage file with references to other files to download), and use such responsive data to render and display the requested webpage. Webpage files that may be downloaded to the user device 120 may include not only files corresponding to content that is actually displayed as part of the webpage, but also associated files.

Web server 130, identifier server 140, and service providers 150 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Web server 130 may be any kind of server used to host web content, including any type of webpage or website data. The particular files associated with each webpage may be controlled by a publisher (or designated administrator). The webpage file may include links to files under control by other parties. In that regard, the webpage files downloaded from web server 130 may include a reference (e.g., URL) to a browser identifier file, as well as an optional loader application (e.g., Javascript commands) and associated code library to be used with the browser identifier file. The browser may attempt to access the referenced browser identifier file, either automatically or under direction of the loader application as executed by the user device 120. Such access may include automatically checking a local browser cache to determine whether the referenced browser identifier file may have already been downloaded previously.

Following such checking of the local browser cache, the user device 120 may send a request to an identifier server 140 associated with the referenced browser identifier file. Such request may be indicative of whether the referenced browser identifier file was found in the local browser cache (and if so, when the referenced browser identifier file had last been modified). Where the request indicates that the referenced browser identifier file was not found in the local browser cache, the identifier server 140 may respond by sending a new browser identifier file to the user device 120.

In that regard, the identifier server 140 may generate and provide a new unique browser identifier upon request. Such a unique browser identifier may be specific to the browser making the request. Where the user may have opted out, however, a non-unique term may be inserted in place of the unique browser. In some embodiments, the user may opt out of being provided with unique identifiers with respect to a designated webpage or website. Alternatively, the user may opt into being provided with unique identifiers with respect to a designated webpage or website. As such, the browser may be uniquely identified via the unique browser identifier for some webpages, but not others. In some embodiments, such information regarding user opt-outs or opt-ins may be reflected in the browser identifier file. For example, the browser identifier file may include one or more browser identifiers indicative of the user opt-in or opt-out for defined webpages, websites, or categories of websites, as well as indicators specifying the granular details under which the opt-in or opt-out are to be implemented.

The user may also opt to reset the unique browser identifier associated with the browser of the user device 120. Resetting the unique browser identifier may involve clearing the local browser cache of any previously downloaded browser identifier files, generating a new browser identifier (in a new browser identifier file), and providing the new browser identifier file, which may then be cached in the local browser cache. In some embodiments, a signal may be sent to the identifier server 140 to indicate that the browser identifier file needs to be updated. Such a signal may be implemented in a cookie that the identifier server 140 can read and then determine what to send back as the browser identifier file. Alternatively, the request (including pass information or parameters) may be directed to a transient URL (e.g., that is structured to include the browser identifier and any directives), and that request may then be redirected to the identifier server 140, which can then look at the referrer header (e.g., transient URL) of the request to parse out the requested changes to the browser identifier file.

Further, the identifier server 140 may provide a plurality of unique browser identifiers (each to a different browser and provided in a different browser identifier file). Activity at the user device 120 in relation to the webpage may thereafter be associated with the provided unique browser identifier, thereby allowing for the ability to distinguish between different browsers on the same or different computing devices in some cases. Specifically, information may be logged regarding activity by a particular browser (as identified by a unique identifier), which may be provided to identifier server 140 (or an associated server) by a loader application at the user device 120. In that regard, the identifier server 140 may not receive the browser identifier itself, as the browser identifier may only be called by local applications or code (e.g., browser, loader application, local code library) resident on the user device 120. The loader application may be executed to perform a variety of functions, which may include loading and executing code from the code library. Such a code library may be provided, modified, and updated at the web server 130, identifier server 140, or other designated service provider 150.

Where the referenced browser identifier file was indeed found in the local browser cache, the browser may send a request with an indicator (e.g., a "if-modified-since" header) regarding the referenced browser identifier file to the identifier server 140. The identifier server 140 may then determine whether an updated version of the referenced browser identifier file should be sent based on information provided in the request (e.g., whether or not a "if-modified-since" header exists for the referenced browser identifier file) or associated cookies, referrer headers, etc. If the referenced browser identifier file is determined to be in the local browser cache (e.g., as indicated by the existence of an associated "if-modified-since" header in the request), the identifier server 140 may validate the file and send an indicator (e.g., a "304 not modified" indicator) regarding such validation. In some embodiments, such validation may extend a maximum age or expiration date/term of the referenced browser identifier file, whereby the referenced browser identifier file may be maintained an extended period of time (corresponding to the extended maximum age or expiration date/term) in the local browser cache. Where the user may have opted out (e.g., as indicated by an opt-out cookie), however, the identifier server 140 may return a browser identifier file with a non-unique browser identifier or an opt-out identifier.

The browser may not necessarily request that the identifier server 140 validate the referenced browser identifier file in some instances. In such instances, the browser may use the cached browser identifier file without making any request to the identifier server 140.

In some cases, the referenced browser identifier file may be determined to require an update. For example, a cookie without an "if-modified-since" header may indicate that the referenced browser identifier file had previously been present but is no longer found (in whole or in part) in the local browser cache. Upon determining that such modification may have occurred (e.g., as indicated by a header or other indicator in the request), the identifier server 140 may recreate the referenced browser file or send a new browser identifier file to the user device 120. While the foregoing refers primarily to modification headers, any type of cache control headers (or any type of cache control commands) known in the art may be used. Cache control may involve any operation involving cache memory, including directing validation and adjusting maximum ages as desired, as well as control where the browser identifier file is cached (e.g., specify local browser cache).

A browser identifier file may be any type of file that may be cached in local browser cache memory, including stylesheets, JavaScript files, HTML files, text files, AJAX requests, image files, etc. Such browser identifier file may allow for its content (including the browser identifier, whether unique or non-unique) to be accessible to the browser and related browser applications (including a loader application). As such, the browser and related browser applications may access and use the browser identifier for various operations, including logging activity.

A browser identifier file may include a browser identifier, which may be unique to the browser at user device 120 that requested the webpage. In some cases, the user may opt out of having their browser be provided with a unique browser identifier. In such cases, a new browser identifier file may be generated with a non-unique term as the browser identifier. Alternatively, the browser identifier file may be updated to replace the unique identifier with a non-unique term (or an opt-out identifier for defined or general opt-out).

In some embodiments, the browser identifier file may further include other types of information regarding user preferences (as designated by the user), including information regarding user opt-outs or opt-ins for specific webpages. As the user changes their opt-out or opt-in settings, such information may be used to update a browser identifier file. The browser may then be directed to reload the browser identifier file into the local browser cache, thereby implementing the updated user settings.

Service providers 150 may include servers or other computing devices that may provide various services based on identification of a browser. For example, a service provider 140 may use information regarding repeat visits to provide targeted advertising to repeat visitors (versus first-time visitors).

Figure 2:
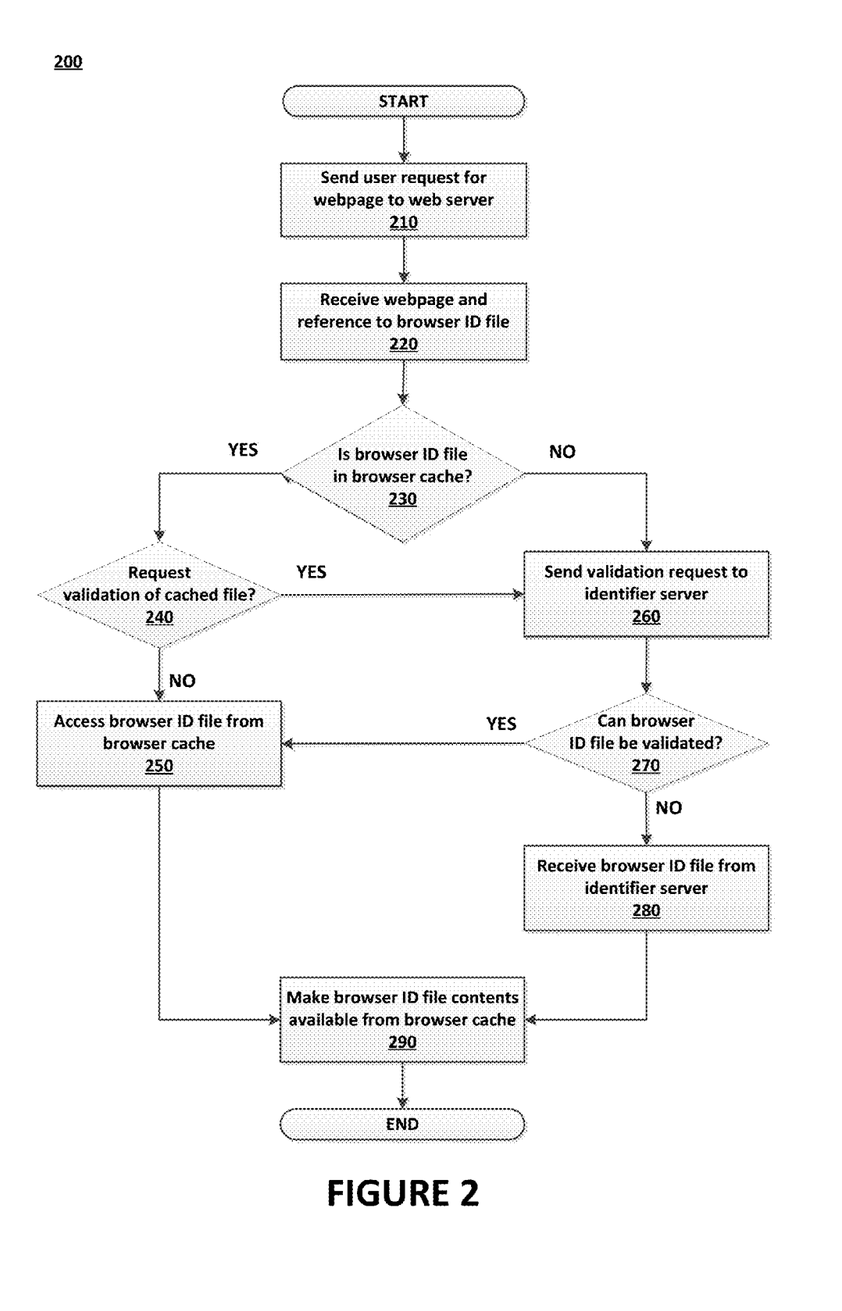
FIG. 2 is a flowchart illustrating an exemplary method for associating unique identifiers with browsers.

FIG. 2 illustrates a method 200 for associating unique identifiers with browsers. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, a webpage request is sent via a browser of a user device to a web server, whose response includes a reference to a browser identifier file. The browser automatically checks a local browser cache for the referenced browser identifier file. If the referenced browser identifier file is found in the local browser cache, the referenced browser identifier file may be immediately provided and its contents made accessible to the browser (or other applications). In some cases, a request may be sent to an identifier server to validate the referenced browser identifier file as current. If the referenced browser identifier file can be validated, the identifier server returns an indicator of the same, and the referenced browser identifier file in local browser cache may thereafter be used. If the referenced browser identifier file is not found in the local browser cache or if the referenced browser identifier file cannot be validated for any reason, the identifier server may generate (or recreate) the referenced browser identifier file and provide the same to the requesting user device. The referenced browser identifier file may therefore be stored in the local browser cache and its contents made accessible therefrom.

In step 210, a request for a particular webpage (e.g., as identified by a URL) may be entered by the user via a browser of a user device 120, which may send such request to the web server 130 associated with the webpage.

In step 220, the web server 130 provides webpage content to the browser of user device 120. Such webpage content may be associated with the reference to a browser identifier file. Such a reference may be another URL that resolves to identifier server 140. In some embodiments, the reference sent by the web server 140 may pertain to a loader application that is executable to reference the browser identifier file. As such, steps 230-290 may be performed by the browser under direction of the loader application.

In step 230, the browser may check a local browser cache to determine whether the referenced browser identifier file is found. If the referenced browser identifier file is indeed found in the local browser cache, the method may proceed to step 240. If the referenced browser identifier file is not found in the local browser cache, the method may proceed to step 260, where a request for the referenced browser identifier file is sent to the identifier server 140.

In step 240, it may be determined whether to request validation of the browser identifier file found in the local browser cache. In some embodiments, the browser of the user device 120 may be instructed (e.g., a maximum age parameter) to use the referenced browser identifier file found in the local browser cache without requiring validation. If the referenced browser identifier file does not need to be validated, the method may proceed to step 250, where the referenced browser identifier file may be accessed by the browser of the user device 120 directly from the local browser cache as is.

If the referenced browser identifier file needs to be validated, the method may proceed to step 260, where a request for the referenced browser identifier file is sent to the identifier server 140. The identifier server 140 may then determine in step 270 whether the browser identifier can be validated. Such a determination may be based on the presence of a header, cookie, or other indicator regarding modification of the referenced browser identifier file (e.g., an "if-modified-since" indicator).

Where the determination is made by the identifier server 140 that the referenced browser identifier file can be validated, the identifier server may send an indicator regarding such lack of modification to the user device 120. The method may then proceed to step 250, where the browser at user device 120 uses the referenced browser identifier file found in its local browser cache.

If the browser identifier file cannot be validated (e.g., based on lack of a header) responsive to the request, the identifier server 140 may then generate or recreate the referenced browser identifier file. The method may then proceed to step 280, where the user device 120 receives the referenced browser identifier file sent from the identifier server 140, which then provides the referenced browser identifier file to local browser cache in step 290. The browser identifier in the referenced browser identifier file may therefore persist in the local browser cache, though subject to various cache directives or browser settings (e.g., maximum age, expiration date/term). In addition to one or more browser identifiers, the referenced browser identifier file may further include information regarding user opt-outs, preferences, reset, etc. Such information in the browser identifier file may be accessed by executable code (e.g., from the code library).

In step 290, the browser identifier file (and its contents) in the local browser cache are made available and accessible to the browser and/or other local applications and code. In that regard, such applications may access the browser identifier (whether unique, non-unique, or flags specifying where unique and non-unique identifiers are to be used) for use as a variable in any operation known in the art. As such, the browser identifier may be used to identify a particular browser without having to necessarily identify any potentially personally identifiable information. In that regard, some embodiments provide for an authentication mechanism that controls whether and how the browser identifier may be provided or used.

Figure 3:
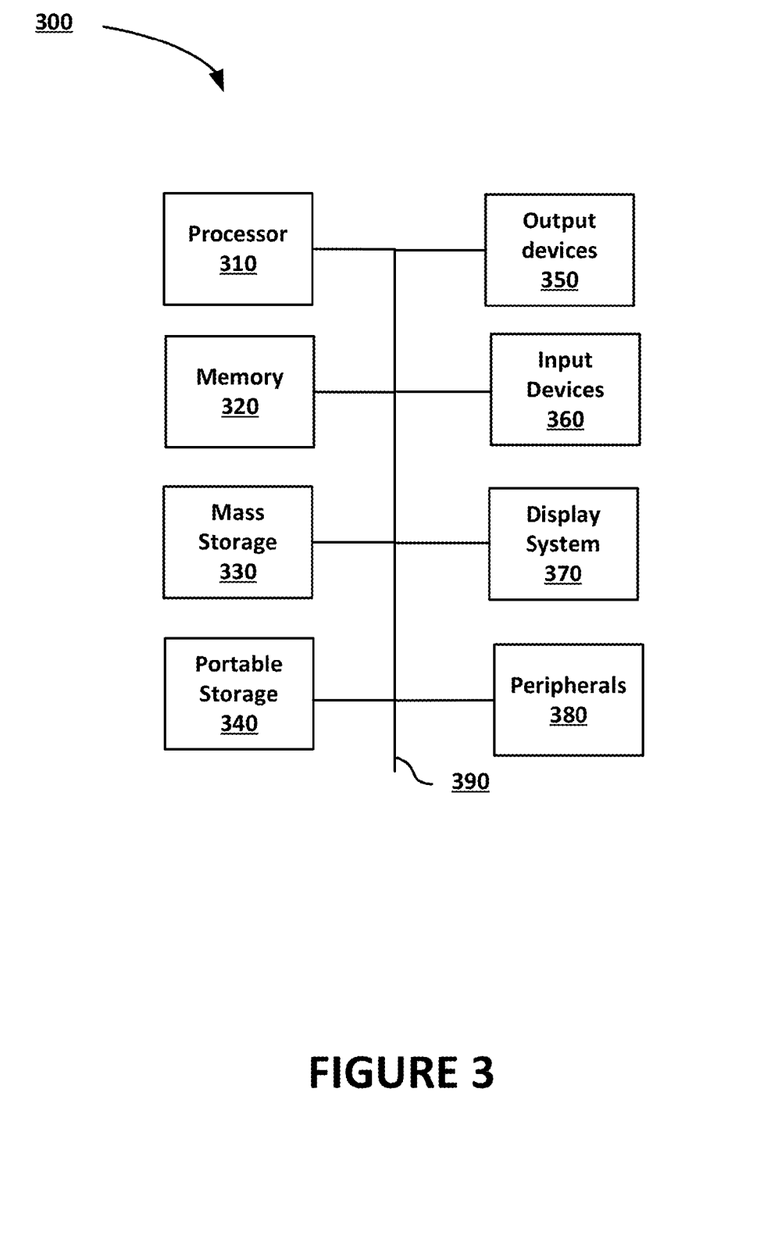
FIG. 3 illustrates an exemplary computing system that may be used to implement an embodiment of the present invention

FIG. 3 illustrates an exemplary computing system 300 that may be used to implement an embodiment of the present invention. System 300 of FIG. 3 may be implemented in the contexts of the likes of user devices 120A-D, web server 130, identifier server 140, and service provider 150. The computing system 300 of FIG. 3 includes one or more processors 310 and memory 310. Main memory 310 stores, in part, instructions and data for execution by processor 310. Main memory 310 can store the executable code when in operation. The system 300 of FIG. 3 further includes a mass storage device 330, portable storage medium drive(s) 340, output devices 350, user input devices 360, a graphics display 370, and peripheral devices 380.

The components shown in FIG. 3 are depicted as being connected via a single bus 390. However, the components may be connected through one or more data transport means. For example, processor unit 310 and main memory 310 may be connected via a local microprocessor bus, and the mass storage device 330, peripheral device(s) 380, portable storage device 340, and display system 370 may be connected via one or more input/output (I/O) buses.

Mass storage device 330, which may be implemented with a magnetic disk drive or an optical disk drive, is a non-volatile storage device for storing data and instructions for use by processor unit 310. Mass storage device 330 can store the system software for implementing embodiments of the present invention for purposes of loading that software into main memory 310.

Portable storage device 340 operates in conjunction with a portable non-volatile storage medium, such as a floppy disk, compact disk (CD) or digital video disc (DVD), to input and output data and code to and from the computer system 300 of FIG. 3. The system software for implementing embodiments of the present invention may be stored on such a portable medium and input to the computer system 300 via the portable storage device 340.

Input devices 360 provide a portion of a user interface. Input devices 360 may include an alpha-numeric keypad, such as a keyboard, for inputting alpha-numeric and other information, or a pointing device, such as a mouse, a trackball, stylus, or cursor direction keys. Additionally, the system 300 as shown in FIG. 3 includes output devices 350. Examples of suitable output devices include speakers, printers, network interfaces, and monitors.

Display system 370 may include a liquid crystal display (LCD) or other suitable display device. Display system 370 receives textual and graphical information, and processes the information for output to the display device.

Peripherals 380 may include any type of computer support device to add additional functionality to the computer system. For example, peripheral device(s) 380 may include a modem or a router.

The components contained in the computer system 300 of FIG. 3 are those typically found in computer systems that may be suitable for use with embodiments of the present invention and are intended to represent a broad category of such computer components that are well known in the art. Thus, the computer system 300 of FIG. 3 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for associating unique identifiers with browsers, the method comprising:

finding a reference to a browser identifier file in a download of a webpage by a browser in use at a computing device, wherein the browser in use checks a local browser cache for the referenced browser identifier file;

sending a request regarding the referenced browser identifier file over a communication network to an identifier server, the request indicative of whether the referenced browser identifier file is found in the local browser cache;

receiving a response over the communication network from the identifier server, wherein the response includes the referenced browser identifier file when the referenced browser identifier file is not found in the local browser cache, the referenced browser identifier file in the response then being cached in the local browser cache, and wherein the response includes an indicator when the referenced browser identifier file is found in the local browser cache, the indicator directing the browser in use to use the referenced browser identifier file in the local browser cache; and providing that content in the referenced browser identifier file in the local browser cache is accessible by the browser in use, wherein the content includes a browser identifier that identifies the browser in use at the computing device, and wherein the identifier server has assigned each of a plurality of other browser identifiers to a different browser at the computing device or at another computing device.

2. A method for associating unique identifiers with browsers, the method comprising:

receiving a request sent over a communication network by a browser in use at a computing device, the request based on a reference to a browser identifier file in a webpage downloaded to the browser in use and indicating that the referenced browser identifier file was not found in a local browser cache of the browser in use;
executing instructions stored in memory, wherein execution of the instructions by a processor:
assigns a browser identifier file to the browser in use at the computing device, wherein the browser identifier uniquely identifies the browser in use at the computing device, wherein each of a plurality of other browser identifiers uniquely identifies a different browser at the computing device or at another computing device, and
generates a browser identifier file comprising the browser identifier that uniquely identifies the browser in use at the computing device; and
sending the browser identifier file over the communication network to the browser in use at the computing device, wherein the browser identifier file is cached in the local browser cache and is accessible to the browser in use at the computing device.

3. The method of claim 2, further comprising receiving a subsequent request indicating that the browser identifier file is found in the local browser cache.

4. The method of claim 3, further comprising generating a response that includes an indicator directing the browser in use at the computing device to use the referenced browser identifier file as found in the local browser cache, and transmitting the generated response over the communication network to the browser in use at the computing device.

5. The method of claim 2, further comprising logging information in memory regarding the browser identifier that uniquely identifies the browser in use at the computing device, wherein the logged information pertains to activity by the browser in use across a plurality of different websites.

6. The method of claim 5, further comprising:
receiving a subsequent request sent over the communication network from the browser in use at the computing device, wherein the subsequent request indicates that the referenced browser identifier file was found in the local browser cache of the browser in use; and
validating the browser identifier file based on one of a header of the browser identifier file, an amount of time since modification, an expiration date, an expiration term, and a maximum age.

7. The method of claim 6, wherein the validation is successful, and further comprising transmitting a validation indicator over the communication network to the browser in use at the computing device, and wherein a lifespan of the browser identifier file in the local browser cache is extended based on the validation.

8. The method of claim 6, wherein the validation is not successful, and further comprising:
generating an updated browser identifier file comprising a new browser identifier assigned to the browser in use at the computing device; and
transmitting the updated browser identifier file over the communication network to the computing device in response to the subsequent request, wherein the updated browser identifier file replaces the browser identifier file cached in the local browser cache.

9. The method of claim 8, wherein the subsequent request indicates that a user of the computing device has chosen to opt out of unique browser identifier usage, and wherein the new browser identifier is indicative of the opt-out.

10. The method of claim 9, wherein the browser identifier indicative of the opt-out is not unique to the browser in use at the computing device, and wherein subsequent logging of activity by the browser in use at the computing device is associated with the new browser identifier.

11. The method of claim 9, wherein the browser identifier indicative of the opt-out is specific to a set of one or more webpages, and wherein no further information is logged regarding browser activity related to the set of one or more webpages by the browser in use at the computing device.

12. The method of claim 8, wherein the subsequent request indicates that a user of the computing device has chosen to reset, and wherein subsequent logging of information pertains to activity by the browser in use across a plurality of different websites.

13. The method of claim 2, wherein the browser in use at the computing device subsequently downloads the webpage again, and wherein the browser in use retrieves the browser identifier file from the local browser cache instead of requesting the browser identifier file.

14. The method of claim 2, wherein
receiving a subsequent request sent over the communication network from the browser in use at the computing device, wherein the subsequent request indicates that the referenced browser identifier file was not found in the local browser cache of the browser in use; and
re-generating the browser identifier file with the same browser identifier that uniquely identifies the browser in use at the computing device.

15. The method of claim 2, wherein the browser identifier file is one of a stylesheet file, a cascading stylesheet file, a JavaScript file, and a hypertext markup language (HTML) file.

16. The method of claim 2, wherein the browser identifier file associated with a loader application executable by a processor of the computing device to direct the browser in use to access the browser identifier file from the local browser cache.

17. The method of claim 16, wherein the loader application is associated with a code library of executable code that refers to content in the browser identifier file.

18. An identifier server apparatus for associating unique identifiers with browsers, the identifier server apparatus comprising:
a communication interface that receives a request sent over a communication network by a browser in use at a computing device, the request based on a reference to a browser identifier file in a webpage downloaded to the browser in use and indicating that the referenced browser identifier file was not found in a local browser cache of the browser in use; and
a processor that executes instructions stored in memory, wherein execution of the instructions by the processor:
assigns a browser identifier file to the browser in use at the computing device, wherein the browser identifier uniquely identifies the browser in use at the computing device, wherein each of a plurality of other browser identifiers uniquely identifies a different browser at the computing device or at another computing device, and
generates a browser identifier file comprising the browser identifier that uniquely identifies the browser in use at the computing device; and
wherein the communication interface sends the browser identifier file over the communication network to the browser in use at the computing device, wherein the browser identifier file is cached in the local browser cache and is accessible to the browser in use at the computing device.

19. A system for associating unique identifiers with browsers, the system comprising:
- a web server that provides a download of a web page to a browser in use at a computing device, wherein the download includes a reference to a browser identifier file; and
- an identifier server comprising:
  - a communication interface that receives a request sent over a communication network from the browser in use at the computing device, the request based on the referenced browser identifier file and indicating that the referenced browser identifier file was not found in a local browser cache of the browser in use; and
  - a processor that executes instructions stored in memory, wherein execution of the instructions by the processor:
    - assigns a browser identifier file to the browser in use at the computing device, wherein the browser identifier uniquely identifies the browser in use at the computing device, wherein each of a plurality of other browser identifiers uniquely identifies a different browser at the computing device or at another computing device, and
    - generates a browser identifier file comprising the browser identifier that uniquely identifies the browser in use at the computing device; and
  - wherein the communication interface sends the browser identifier file over the communication network to the browser in use at the computing device, wherein the browser identifier file is cached in the local browser cache and is accessible to the browser in use at the computing device.

20. A non-transitory computer-readable storage medium, having embodied thereon a program executable by a processor to perform a method for associating unique identifiers with browsers, the method comprising:
- receiving a request sent over a communication network by a browser in use at a computing device, the request based on a reference to a browser identifier file in a webpage downloaded to the browser in use and indicating that the referenced browser identifier file was not found in a local browser cache of the browser in use;
- executing instructions stored in memory, wherein execution of the instructions by a processor:
  - assigns a browser identifier file to the browser in use at the computing device, wherein the browser identifier uniquely identifies the browser in use at the computing device, wherein each of a plurality of other browser identifiers uniquely identifies a different browser at the computing device or at another computing device, and
  - generates a browser identifier file comprising the browser identifier that uniquely identifies the browser in use at the computing device; and
- sending the browser identifier file over the communication network to the browser in use at the computing device, wherein the browser identifier file is cached in the local browser cache and is accessible to the browser in use at the computing device.

* * * * *